US012288237B2

United States Patent
Rossi et al.

(10) Patent No.: US 12,288,237 B2
(45) Date of Patent: Apr. 29, 2025

(54) ONLINE INFERENCE AND LEARNING FOR NONSYMMETRIC DETERMINANTAL POINT PROCESSES

(71) Applicant: Adobe Inc., San Jose, CA (US)

(72) Inventors: Ryan A. Rossi, San Jose, CA (US); Aravind Reddy Talla, Evanston, IL (US); Zhao Song, San Jose, CA (US); Anup Rao, San Jose, CA (US); Tung Mai, San Jose, CA (US); Nedim Lipka, Campbell, CA (US); Gang Wu, San Jose, CA (US); Eunyee Koh, Sunnyvale, CA (US)

(73) Assignee: Adobe Inc., San Jose, CA (US)

( * ) Notice: Subject to any disclaimer, the term of this patent is extended or adjusted under 35 U.S.C. 154(b) by 223 days.

(21) Appl. No.: 17/743,360

(22) Filed: May 12, 2022

(65) Prior Publication Data
US 2023/0368265 A1 Nov. 16, 2023

(51) Int. Cl.
G06Q 30/0601 (2023.01)

(52) U.S. Cl.
CPC ..... *G06Q 30/0631* (2013.01); *G06Q 30/0629* (2013.01); *G06Q 30/0643* (2013.01)

(58) Field of Classification Search
None
See application file for complete search history.

(56) References Cited

U.S. PATENT DOCUMENTS 10,475,103 B2 * 11/2019 Hiranandani ...... G06Q 30/0631
2017/0255862 A1 * 9/2017 Li ........................ G06F 16/9035

OTHER PUBLICATIONS

Anari, N., and Vuong, T-D., "From Sampling to Optimization on Discrete Domains with Applications to Determinant Maximization", arXiv:2102.05347v3, pp. 1-22 (Sep. 15, 2021).
Brunel, V-E., et al., "Rates of estimation for determinantal point processes", In Conference on Learning Theory, arXiv:1706.00961v2, pp. 1-17 (Jul. 21, 2017).
Gillenwater, J., et al., "Maximizing Induced Cardinality Under a Determinantal Point Process", 32nd Conference on Neural Information Processing Systems (NeurIPS), pp. 1-10 (2018).
Mirzasoleiman, B., et al., "Lazier Than Lazy Greedy", Proceedings of the Twenty-Ninth AAAI Conference on Artificial Intelligence, pp. 1812-1818 (2015).

(Continued)

*Primary Examiner* — Michelle T Kringen
(74) *Attorney, Agent, or Firm* — Shook, Hardy & Bacon L.L.P.

(57) ABSTRACT

Embodiments provide systems, methods, and computer storage media for a Nonsymmetric Determinantal Point Process (NDPPs) for compatible set recommendations in a setting where data representing entities (e.g., items) arrives in a stream. A stream representing compatible sets of entities is received and used to update a latent representation of the entities and a compatibility distribution indicating likelihood of compatibility of subsets of the entities. The probability distribution is accessed in a single sequential pass to predict a compatible complete set of entities that completes an incomplete set of entities. The predicted complete compatible set is provided a recommendation for entities that complete the incomplete set of entities.

20 Claims, 6 Drawing Sheets

(56) References Cited

OTHER PUBLICATIONS

Bhaskara, A., et al., "Online MAP Inference of Determinantal Point Processes", 34th Conference on Neural Information Processing Systems (NeurIPS), pp. 1-11 (2020).

Fiedler, M., and Pták, V., "Some Generalizations of Positive Definiteness and Monotonicity", Numerische Mathematik, vol. 9, Issue 2, pp. 163-172 (1966).

Kulesza, A., and Taskar, B., "Determinantal Point Processes for Machine Learning", Foundations and Trends® in Machine Learning, vol. 5, Nos. 2-3, pp. 1-166 (2012).

Nemhauser, G., et al., "An Analysis of Approximations for Maximizing Submodular Set Functions-I", Mathematical Programming, vol. 14, pp. 265-294 (1978).

Bian, A. A., et al., "Guarantees for Greedy Maximization of Non-submodular Functions with Applications", In International Conference on Machine Learning (ICML), arXiv:1703.02100v3, pp. 1-27 (Jun. 13, 2017).

Gartrell, M., et al., "Learning Nonsymmetric Determinantal Point Processes", 33rd Conference on Neural Information Processing Systems (NeurIPS), pp. 1-11 (2019).

Kulesza, A., and Taskar, B., "k-DPPs: Fixed-Size Determinantal Point Processes", Proceedings of the 28th International Conference on Machine Learning (ICML), pp. 1-8 (2011).

Roughgarden, T., "Communication Complexity (for Algorithm Designers)", arXiv:1509.06257v1, pp. 1-150 (Sep. 21, 2015).

Aho, A. V., et al., "The Design and Analysis of Computer Algorithms", Addison-Wesley Publishing Company, pp. 1-479 (1974).

Brunel, V-E., "Learning Signed Determinantal Point Processes through the Principal Minor Assignment Problem", In Neural Information Processing Systems (NeurIPS), pp. 1-10 (2018).

Gartrell, M., et al., "Scalable Learning and Map Inference for Nonsymmetric Determinantal Point Processes", In International Conference on Learning Representations (ICLR), arXiv:2006.09862v2, pp. 1-21 (Apr. 13, 2021).

Liu, P., et al., "Diversity on the Go! Streaming Determinantal Point Processes under a Maximum Induced Cardinality Objective", In Proceedings of the International World Wide Web Conference, pp. 1-10 (Apr. 19-23, 2021).

* cited by examiner

ONLINE INFERENCE AND LEARNING FOR NONSYMMETRIC DETERMINANTAL POINT PROCESSES

BACKGROUND

Finding compatible items in sets of collected data is useful in a variety of fields such as data analytics, e-commerce, web analytics, workflow design, and others. Taking e-commerce as an example, when a customer of an e-commerce platform adds a product like a modem to his or her shopping cart, the provider of the e-commerce platform may want to suggest that the customer add a compatible product, such as a router. In another example, when a database or analytics system presents an analyst or other user with data, it may be desirable to for the database or analytics system to suggest data tables with compatible sets of attributes that might be of interest to the user. Generally, the concept of compatible may encompass not only similarity, but also diversity. For example, the customer who added the modem to his or her shopping cart may be interested in complementary items, like the router, but likely would not be interested in another modem. Sometimes, these items may be data attributes, visualizations, commands, products or services, web pages, and/or other traits or characteristics. Compatible sets of items may be items that are typically purchased together, a set of commands used in session of an application, a set of visited webpages, and/or other data attributes.

SUMMARY

Embodiments of the present invention are directed to techniques for identifying compatible sets of entities. In an example embodiment, a stream representing compatible sets of entities is received and used to update a latent representation of the entities and a compatibility distribution indicating likelihood of compatibility of subsets of the entities. The probability distribution is accessed in a single sequential pass to predict a compatible complete set of entities that completes an incomplete set of entities. The predicted complete compatible set is provided a recommendation for entities that complete the incomplete set of entities.

In an example embodiment, a learning system maintains the compatibility distribution using a received stream of compatible sets to update components matrices of the compatibility distribution with embeddings corresponding to the compatible sets. For example, data arriving in the stream is used to update the compatibility distribution and make inferences in real-time while using sub-linear space (e.g., less than the size of the dataset) and a small per-point processing time. In various implementations, data points arrive in a stream of data, and a near-optimal solution of compatible sets of items is quickly updated while using a reduced memory size since and without storing the entire stream of data to update the compatibility distribution.

In some embodiments, the compatibility distribution comprises a Nonsymmetric Determinantal Point Process (NDPP) used to solve inference and/or learning problems in an online setting where data representing entities (e.g., items) arrives in a stream, while maintaining an optimal or substantially optimal solution as the data continuously arrives, allowing solutions to be determined more efficiently and with decreased memory utilization. Embodiments determine an updated solution by replacing an index of an existing solution set with the new entity to generate an updated solution set and applying an objective function to the updated solution set. In some cases, if the result of applying the objective function to the updated solution set is greater that the result of applying the objective function to the existing solution set, the updated solution set is identifying as a more optimal solution and used for subsequent computation as more entities arrive in the stream of entities.

Depending on the embodiment, the present techniques are used in a variety of applications, from recommending compatible products to an e-commerce basket, to recommending a compatible command in response to one or more received commands, to recommending compatible visualizations for a dashboard, recommending compatible attributes for a data table, and/or other examples.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

Overview

Figure 1:
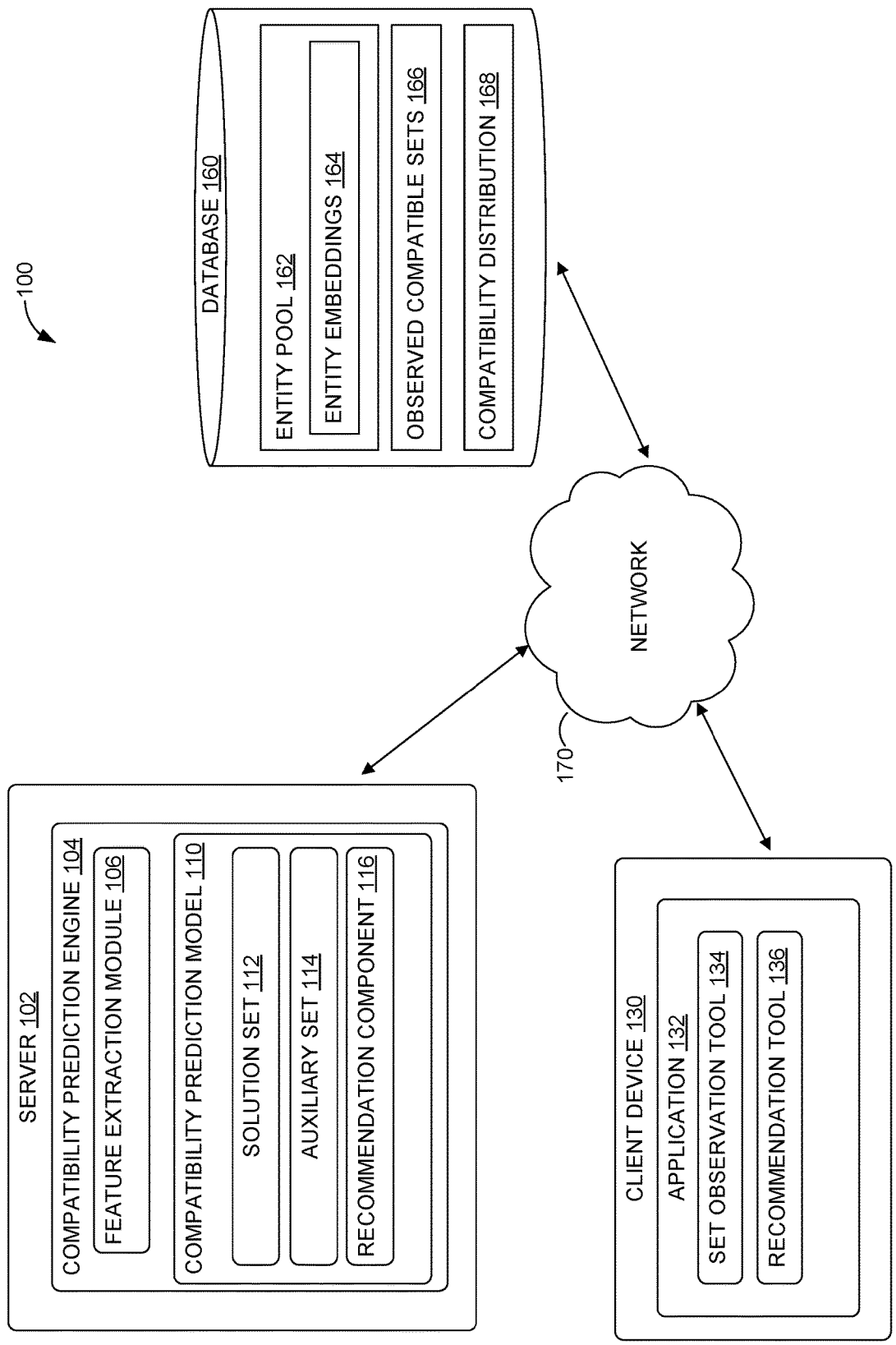
FIG. 1 is a block diagram of an example computing system suitable for identifying compatible sets of items, in accordance with embodiments of the present invention.

One way to find a compatible set of items from a collection of items is to model the items in the collection and identify positive correlations among the items. However, since the size of datasets in which compatible items are sought are often large, significant memory resources are required to analyze the datasets to identify compatible items. More specifically, state-of-the-art techniques for predicting compatibility typically require storing and taking multiple passes over the full collection of items in memory. As a result, these algorithms typically take too much memory to be useful for large scale data, where the size of the entire dataset can be much larger than the random-access memory available. Furthermore, taking multiple passes over a dataset is impractical where efficient computation is more important. Finally, existing techniques are also inefficient in time, space, or and cannot handle large real-world streaming data that arrives continuously over time.

More specifically, some existing techniques leverage Determinantal Point Processes (DPPs) to recommend compatible sets of items using machine learning for probabilistic modeling of data. This recent work has relied on setting a probability distribution of a DPP to be expressed as a symmetric matrix. However, since the distribution is expressed as a symmetric matrix, only negative correlations between items may be modeled. Since DPPs cannot model positive correlations, the expressive power of a symmetric DPP that is applied to a set of items is limited. Some other conventional techniques have implemented a Nonsymmetric Determinantal Point Process (NDPP) that attempts to model positive correlations between items in a set. These conventional NDPP techniques and algorithms require storing the full set of data in memory and performing operations that make multiple passes over the complete set of data. Unfortunately, such solutions require significant amounts of memory since real world datasets are typically very large in size and are often much larger than the available random-access memory. Further, storing entire sets of data and making multiple passes over the data is inefficient in terms of computation resources required and computational time that is necessary. Additionally, these conventional techniques are not suitable in settings where data is arriving in a stream where large quantities of streaming data arrives continuously over a period of time. Many systems generate data serially as new data instances are added over time. For example, in an e-commerce system items may be added to a store and the carts of users over time. In some situations, it is advantageous to maintain a valid solution of compatible sets items at each increment of time as new data items arrive in a data stream without having to store the information related to each data item in memory. For example, when a collection of items is regularly being updated, a solution for a compatible set of items may be needed at any given point in time.

Although conventional methods have focused on improving the scalability of NDPPs, existing techniques are fundamentally offline and not amenable to streaming and online settings. For instance, existing techniques require all data to be stored in memory and are therefore unable to handle the online streaming where the full length of a data stream exceeds the size of available memory. Furthermore, since conventional techniques take multiple passes over a dataset, they are impractical for streaming and online settings where time efficient computation is more important. Finally, conventional techniques are also inefficient in either time, space, or both and cannot adequately handle large real-world streaming data that arrives continuously over time.

Accordingly, embodiments of the present invention are directed to techniques for identifying compatible sets of entities. In an example embodiment, the disclosed techniques are achieved using a learning system that maintains a compatibility distribution based on a received stream of compatible sets used to update components matrices of the compatibility distribution or kernel with embeddings corresponding to the compatible sets. In some embodiments where data arrives in a stream, the compatibility distribution is updated to make inferences in real-time while using sub-linear space (e.g., less than the size of the dataset) and a small per-point processing time. In such an example, data points arrive in a stream of data and a near-optimal solution of compatible sets of items are quickly updated while using a reduced memory size since storing the entire stream of data is not necessary to update the compatibility distribution.

Embodiments of the present invention are used in a streaming setting, where data points arrive in an arbitrary order and algorithms are constrained to use a single-pass over the data and/or sub-linear memory (i.e. memory that is substantially smaller than the size of the data stream). Additionally or alternatively, embodiments are used in an online setting that has the constraints of the streaming setting with the additional condition that a valid solution is maintained or "online" at each time step.

In some examples, maintaining compatible sets of items involves updating embeddings associated with the items as items are added to a collection, removed from the collection, or interacted with in some way. For example, in some cases, as user behavior associated with a shopping basket changes over time, the embeddings associated with the items in the basket also change over time such that a most compatible set of items at a first point in time is different from the most compatible set of items at a second point in time. Thus, in some embodiments, as items are interacted with, the previously computed embeddings associated with the items are updated, for example to prevent or minimize concept drift as the properties of the set of items change over time in potentially unforeseen ways. Since some implementations update the embeddings over time to reflect changes to a set of items, the present techniques effectively provide better recommendations of compatible sets of items over prior techniques that do not update embeddings in this way.

As an example, some embodiments facilitate the recommendation of user dashboards (e.g., users create dashboards in application, analytic systems, and other contexts) using determined compatible sets of items. In some such examples, a dashboard can be thought of as set of visualizations that are compatible. Users often create dashboards of interest by selecting visualizations to add to a current or active dashboard. However, creating such dashboards takes a lot of time and expertise from the user. Providing recommended sets of visualizations based on a user's behavior (e.g., previously view or selected visualizations) allows for relevant dashboards of compatible visualizations to be determined and provided to the user, facilitating a more efficient user experience, as users no longer need to utilize trial an error (and the concomitant computing resources) to test out different variations before discovering compatible visualizations.

As an additional example, embodiments determine compatible set of items in an e-commerce setting. For example, when a customer of an e-commerce platform adds a product like a modem to his or her shopping cart, the provider of the e-commerce platform may want to suggest that the customer add a compatible product, such as a router. In such an example, the existing contents of the shopping cart represent a portion of a compatible set and the suggestion to add additional items is based on determining a compatible set that includes the existing items and one or more additional items. These are just a few examples, and other use cases for recommending compatible sets are contemplated within the scope of the present disclosure. Generally, some embodiments cause a user interface to present a representation of one or more of the recommendations to complete an existing set (e.g., a recommendation to add an item to an e-basket, a recommendation to add a visualization to a dashboard, a recommendation to add an attribute to a table, etc.). If the user selects one of the recommendations, the user interface is updated to reflect the user's choice (e.g., the selected item is added to his or her basket, the selected visualization is added to the dashboard, the recommended attribute is added to the table, etc.).

In some embodiments, updating a compatibility distribution enables providing low-rank compatibility distribution (e.g., a matrix factorization of the compatibility of the arriving stream of sets) for a particular time corresponding to the arriving stream of sets. In this way, embodiments use only a single pass over the received data and/or without storing the entirety of the data in memory to train or update the compatibility distribution. Additionally, since some embodiments update the compatibility distribution as items in a digital collection change (e.g., new items are added, shopping basket behaviors change, etc.), embodiments that leverage such a compatibility distribution server to provide higher quality recommendations over prior techniques.

Some embodiments use the compatibility distribution (e.g., an NDPP kernel) to model the probability of compatibility among sets of items in a collection of items. In some embodiments, the compatibility distribution takes the form of a matrix, data structure, and/or other organization that represents compatible sets of entities (e.g., items). For example, some embodiments express the compatibility distribution as a matrix having a row and column for each entity (e.g., an n×n matrix for a set of n items). In some such cases, the compatibility distribution comprises values indicating a probability that selected items in the collection of items are considered compatible.

In various implementations, a compatibility prediction system includes computing hardware, software, and/or firmware components in support of the compatible set recommendation determinations contemplated herein. Some embodiments use the compatibility prediction system to generate a recommended set of compatible entities. In an example implementation, as data associated with the entities arrives in a stream, a substantially optimal solution set, of a particular size or cardinality, comprising the most compatible entities is determined and provided. As an example, as data associated with user commands in an application are received by the compatibility prediction system, recommended commands are provided based on determining the solution set.

In some implementations, the compatibility distribution maintained by the learning system is applied to a stream of incoming entity data, such as items added to a user's shopping basket. In an example of such scenarios, the compatibility prediction system applies an objective function to a solution set of entity indices and compares the output of the objective function to a candidate solution comprising the solution set with one or more indices replaced with arriving entities. If the candidate solution set provides a more optimal solution based on applying the objective function, the solution set is updated with the replaced indices. For example, if replacing an index of a solution matrix with a newly arrived entity results in a better solution, that updated solution set is used when analyzing subsequent arrival of new entity data. In some implementations, indices of a solution set that are replaced are stored in an auxiliary set such that a neighborhood search is performed on the solution set and the auxiliary set. For example, by using the auxiliary set, a potential solution (e.g., a solution set) is checked against the contents of the auxiliary set to determine if the solution quality (e.g., based on applying the objective function) is improved by including entities from the auxiliary set. In certain embodiments, a search is performed over a neighborhood of the entities of the solution set and the auxiliary set by replacing at most two elements of the solution set to determine if the solution quality (e.g., compatibility) is improved. Thus, strong entity interactions that are captured by multiple entities are used in a recommended solution.

As such, embodiments of the present invention provide various technical improvements to the conventional techniques. Since some embodiments take a single pass over large datasets to determine compatible sets of items in the data sets, fewer computation resources are required. For example, analyzing large datasets as they stream allows for a more efficient processing in terms of time and complexity. Additionally, the disclosed embodiments for predicting compatibility do not require storing and taking multiple passes over the full collection of items in memory which is highly inefficient for large scale data, where the size of the entire dataset can be much larger than the random-access memory available. Thus, embodiments of the present invention provide technical improvements in the use of computational and storage resources of a compatibility prediction system.

As such, using certain implementations described herein, a system is trained to efficiently identify compatible sets of entities and/or entities that are compatible with existing fixed sets. Although certain uses of compatible sets are discussed, it is not intended to be limiting, and any scenario in which compatible entities are identified is contemplated herein. For example, in an implementation in which the entities represent items in a customer's shopping basket or cart in an online marketplace, a compatible set is determined which represents a set of compatible items—the items present in the basket and one or more additional recommended items that complete the compatible set. In certain implementations, the compatible sets of entities represent a set of user commands that can be issued in an application. In such an implementation, a command is recommended to a user based on the determined compatibility with the set of commands that were previously issued by the user in the application session. In some implementations, the entities represent web pages that are visited by a user during one or more online sessions. In some such implementations, the compatible sets of entities are used to recommend one or more additional web pages which are compatible with and/or relevant to previously accessed pages.

In some implementations, the compatible sets of entities represent different sets of user traits associated with user accounts. Example user traits include those that represent played songs, movies watched, and/or any other user information associated with a user account. In some such examples, recommendations are presented to a user based on compatibility with determined sets of user traits. In some implementations, the compatible sets of entities represent different sets of data attributes observed in data visualizations. Users often create dashboards of interest by selecting entities (e.g., visualizations) to add to a current dashboard. In various examples, the entities represent data attributes, values, and/or fields associated with one or more data tables and/or databases. In some such examples, sets of compatible attributes, values, and/or fields are provided based on their calculated level of compatibility.

Example Compatible Set Identification Environment

Referring now to FIG. 1, a block diagram of example environment 100 suitable for use in implementing embodiments of the invention is shown. Generally, environment 100 is suitable for identifying compatible sets of items and, among other things, facilitates generating a recommendation of the identified compatible sets of items. At a high level, environment 100 includes client device 130, server 102, database 160, and network 170.

Depending on the implementation, client device 130 and/or server 102 are any kind of computing device capable of analyzing NDPPs. For example, in an embodiment, client device 130 and/or server 102 are each a computing device such as computing device 600 of FIG. 6. In some embodiments, client device 130 and/or server 102 are a personal computer (PC), a laptop computer, a mobile or mobile device, a smartphone, a tablet computer, a smart watch, a wearable computer, a personal digital assistant (PDA), a music player or an MP3 player, a global positioning system (GPS) or device, a video player, a handheld communications device, a gaming device or system, an entertainment system, a vehicle computer system, an embedded system controller, a camera, a remote control, a bar code scanner, a computerized measuring device, an appliance, a consumer electronic device, a workstation, or any combination of these delineated devices, or any other suitable computer device.

In various implementations, the components of environment 100 include computer storage media that stores information including data, data structures, computer instructions (e.g., software program instructions, routines, or services), and/or models (e.g., 3D models, machine learning models) used in some embodiments of the technologies described herein. For example, in some implementations, database 160 comprises a data store (or computer data memory). Further, although depicted as a single data store component, in some embodiments, source database 160 is embodied as one or more data stores (e.g., a distributed storage network) and/or is implemented in the cloud. Similarly, in some embodiments, client device 130 and/or server 102 comprise one or more corresponding data stores, and/or are implemented using cloud storage.

In the example illustrated in FIG. 1, the components of environment 100 communicate with each other via network 170. In some non-limiting example implementations, network 170 includes one or more local area networks (LANs) and/or wide area networks (WANs). Such networking environments are commonplace in offices, enterprise-wide computer networks, intranets, and the Internet.

In the example illustrated in FIG. 1, client device 130 includes application 132 with set observation tool 134 and recommendation tool 136. In some embodiments, set observation tool 134 and recommendation tool 136, and/or any of the elements illustrated in FIG. 1 are incorporated, or integrated, into an application(s), or an add-on(s) or plug-in(s) to an application(s). In some embodiments, the application(s) is a stand-alone application, a mobile application, a web application, or the like. For example, in some implementations, the application(s) comprises a web application that runs in a web browser and/or is hosted at least partially server-side. In some cases, the application is integrated into an operating system (e.g., as a service). Although some embodiments are described with respect to an application(s), some implementations additionally or alternatively integrate any of the functionality described herein into an operating system (e.g., as a service), a server (e.g., a remote server), a distributed computing environment (e.g., as a cloud service), and/or otherwise.

Depending on the embodiment, various allocations of functionality are implemented across any number and/or type(s) of devices. In the example illustrated in FIG. 1, set observation tool 134 and recommendation tool 136 coordinate via network 170 to execute the functionality described herein. In another example, set observation tool 134 and recommendation tool 136 (or some portion thereof) are integrated into a common application executable on a single device. In yet another example, set observation tool 134 and recommendation tool 136 (or some portion thereof) are distributed across some other number and/or type(s) of devices. These are just examples, and any suitable allocation of functionality among these or other devices is possible within the scope of the present disclosure.

Generally, the set observation tool 134 includes one or more components that facilitate the identification, observation, and/or monitoring of sets of entities. For example, entities corresponding to data which describes a particular object or item. For instance, in certain embodiments, a set of entities corresponding to a set of items in a shopping basket of an online marketplace. In such an example, each item in the basket is monitored by the set observation tool 134, so that the set of items is observed as items are added and/or removed from the shopping basket. In other examples, the set of entities observed by the set observation tool 134 include user commands issued in an application session, a set of webpages visited during a period of time and/or session, a set of traits corresponding to a user or group of users, or a set of data attributes used in a data table, query, or visualization.

The recommendation tool 136 includes one or more components that facilitate presentation of a recommendation of a compatible set of entities. For example, the recommendation tool 136 presents a complete or partial set of entities that have been determined to be compatible. In some embodiments, the recommendation tool 136 provides a recommendation including a suggestion of one or more entities that are compatible with an existing set of entities, such as a set of entities monitored by the set observation tool 134. For example, the recommendation tool 136 provides a recommendation of an item available for purchase that is compatible with the set of items observed in a user's shopping basket. In some other examples, the recommendation tool 136 presents a plurality of entities compatible with a set of entities. For instance, the recommendation tool 136 presents a number of recommended websites to a user, based on the set of websites that the user has visited in one or more web browsing sessions.

The server 102 includes a compatibility prediction engine 104 comprising a feature extraction module 106 and a compatibility predication model 110. Feature extraction module 104 comprises one or more components for online learning of compatibility of entities within sets of entities. The feature extraction module 104 receives one or more observed compatible sets of entities and extracts, or otherwise generates, entity embeddings 164 associated with the sets of entities. In some embodiments, the entity embeddings 164 extracted by the feature extraction module 106 are used to generate compatibility representations, such as compatibility distribution 168, that indicate the compatibility between the entities within the observed set of entities. The extracted entity embeddings 164, the observed compatible sets 166, and/or the compatibility distribution 168 are stored in the database 160. In at least one embodiment, the entity embeddings 164 and/or the compatibility distribution 168 are updated as new sets of entities arrive in a data stream. For example, when a new observed set arrives in a stream, the set is added to the previously arrived observed compatible sets 166 and the embeddings of the newly arrived set are extracted and used to update the compatibility distribution 168.

The compatibility prediction model 110 comprises one or more components for performing online inference operations and receiving data indicative of an incomplete set of entities. For example, the compatibility prediction model 110 receives an incomplete set of entities for which the compatibility prediction model 110 determines one or more entities to include with the incomplete set to generate a complete set of compatible entities. The compatibility prediction model 110 includes a solution set 112, an auxiliary set 114, and/or recommendation component 116.

The compatibility prediction model 110 uses the solution set 112 to maintain a set of entities that represents a potential solution of a compatible set of entities. For example, as the compatibility prediction model 110 analyzes a stream of incoming data in a single pass, the solution set 112 stores the optimal or near-optimal solution of a compatible set of entities. For instance, the solution set 112 stores a first set of entities as being the most compatible until a more compatible solution set is identified from entities arriving in the stream of incoming data. As an example, as each new entity arrives in a stream of data comprising entities, the compatibility predication model 110 evaluates whether the addition of the newly arrived entity to the solution set 112 would increase the probability of compatibility of the solution set 112. In such an example, if the probability of compatibility of the solution set 112 is increased with the insertion of a newly arrived entity, the entity is added to the solution set 112. If the compatibility is not improved, the newly arrived entity is discarded, or otherwise not analyzed further.

In some embodiments, the auxiliary set 114 is used by the compatibility prediction model 110 to store or stash entities that, although not included in a current solution set, may be included in a potential future solution set as additional streamed entities arrive and are analyzed by the compatibility prediction model 110. For example, an arriving entity may provide a higher probability of compatibility in a solution set 112 by replacing an existing entity in the solution. In such an example, the replaced entity is stored in the auxiliary set 114 and used to determine if a more optimal solution is possible by restoring the entity in the auxiliary set 114 to the solution set 112 at a later time when the solution set 112 comprises a different permutation of entities as the solution.

The recommendation component 116 of the compatibility prediction model 110 includes one or more components for generating a recommendation of a compatible set of entities based at least on the solution set 112. The recommendation component 116 provides a recommendation of a compatible set of entities as a stream of entities is received and analyzed or provides a recommendation once an entire stream of data has been analyzed. The recommendation generated by the recommendation component 116 includes each entity that is represented in the solution set 112 or includes a subset of the solution set 112. For example, in the case where one entity is required to complete a compatible set, only the single entity necessary to complete the set is provided as a recommendation by the recommendation component 116. In some embodiments, the recommendation component 116 provides the generated recommendation to the client device 130, such as to the recommendation tool 136.

Database 160 includes a collection of entities in an entity pool 162. The entity pool 162 includes data representing one or more entities. The entity pool 162 includes entity embeddings 164. The entity embeddings 164 stored in the database 160 are generated by the feature extraction module 106. For example, the feature extraction module 106 extracts embeddings from one or more entities in a stream of data and stores the entity embeddings 164 in the database 160.

In some embodiments, the database 160 includes the observed compatible sets 166 used by the feature extraction module 106 to generate the compatibility distribution 168 which is stored in the database 160. In certain embodiments, the feature extraction module 106 retrieves the compatibility distribution 168 from the database 160 so that it can be updated as additional compatible sets are observed.

To begin with a high-level overview of an example workflow through the configuration illustrated in FIG. 1, assume a user operating client device 130 is interacting with the application 132 of the client device 130. For example, the user that is interacting with a database application and interacting with one or more data tables within the database application. In some embodiments, the user wants to consolidate multiple data tables that have various data attributes, into a single data table. In such an example, the set observation tool 134 of the application 132 observes the data attributes for each of the different data tables. The client device 130 transmits, via the network 170, the observed data attributes to the compatibility prediction model 110 of the server 102. The compatibility prediction model 110 analyzes the received data attributes as a stream of entities to determine a set of data attributes that are compatible and are recommended to the user. As the stream of entities is analyzed by the compatibility prediction model 110 the compatibility distribution 168 is retrieved from the database 160 and used to maintain the solution set 112 of the most highly compatible set of entities. Based on the solution set 112, the recommendation component 116 determines a set of entities or data attributes and values to recommend to the user of the client device 130. The server 102 transmits data associated with the recommendation generated by the recommendation component 116 to the client device 130, and use the recommendation tool 136 to present the recommendation to the user, such as by using one or more graphical elements of a graphical user interface (GUI).

In another example embodiment, the feature extraction module 106 is provided with a stream of observed compatible sets 166 corresponding to sets of entities. The feature extraction module 106 extracts features and/or embeddings from the compatible sets and uses the extracted embeddings to generate or update the compatibility distribution 168. The compatibility distribution 168 that is generated by the feature extraction module 106 is stored in the database 160 and used by the compatibility prediction model 110 to determine compatible sets of entities and subsequently recommendations to provide to the user of the client device 130.

Example Embedding Extraction Techniques

Figure 2:
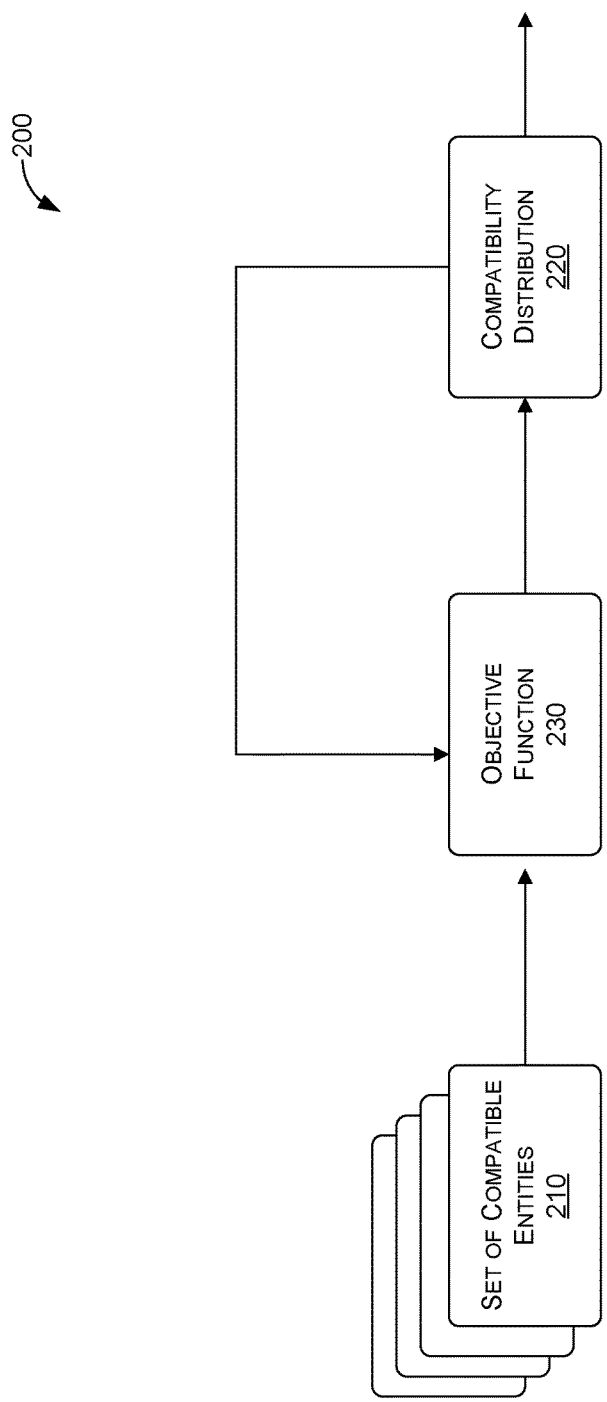
FIG. 2 is a data flow diagram illustrating an example feature extraction module, in accordance with embodiments of the present invention.

FIG. 2 is a data flow diagram illustrating an example feature extraction module 200 including objective function 230 and compatibility distribution 220. In some embodiments, feature extraction module 200 and its components correspond with feature extraction module 106 of FIG. 1 and its components. The feature extraction module 200 is configured to perform a single sequential pass of a stream of the set of compatible entities 210 and update a compatibility distribution 220 before discarding the received stream. In some embodiments, the feature extraction module 200 uses space (e.g., memory, storage, etc.) that is independent of the length of the received stream and update the compatibility distribution 220 in a time that is sub-linear in the number of unique entities in the set of compatible entities 210.

Generally, feature extraction module 200 accepts a stream of representations of an observed set of compatible entities 210, extracts embeddings from the set of compatible entities 210 and generates a compatibility distribution 220 for the entities in the set of compatible entities. The compatible entities are represented in a latent low-dimensional representation (e.g., $(v_i, b_i)$). In some embodiments, a low-dimensional representation (when compared to the size of the stream of representations of an observed set of compatible entities 210) is sufficient for representing entities because any particular entity only interacts with a small number of other entities in real-world cases. For instance, a maximum basket size encountered in real-world data is much generally smaller than all items available in a store.

The compatibility distribution 220 is generated or updated to reflect changes in a set of compatible entities received as a stream from memory (e.g., random access memory) over a period of time. For instance, the previously computed embeddings of a set of compatible entities is updated to limit concept drift as new entities are added or when behaviors associated with the set of compatible entities change. As an example, as more items are added to an online store's inventory, a compatibility distribution of the items available in the store is updated based on extracted embeddings from the newly added items such that better recommendations of compatible sets of items can be inferred. Some embodiments represent the compatibility distribution 220 as one or more matrices. In an example implementation, a compatibility distribution 220 is defined as the kernel:

$$L = V^T V + B^T C B \qquad \text{(Eq. 1)}$$

where V and B are sub-matrices formed by the columns of Z that correspond to particular entities in the sets of compatible entities and C is a skew-symmetric matrix.

Some embodiments apply the objective function 230 to the set of compatible entities 210 to update the compatibility distribution 220. For example, the compatibility distribution 220 is updated as entities are added to the set of compatible entities 210 or as behaviors associated with the set of compatible entities 210 change over a period of time. Some embodiments, apply the objective function 230 to maximize a log-likelihood function. In an example implementation, a log-likelihood function is defined as:

$$\psi_t(V, B, C) = \\ \log\det(V_{S_t}^T V_{S_t} + B_{S_t}^T C B_{S_t}) - Z(V_{S_t}, B_{S_t}, C) - R(V_{S_t}, B_{S_t}) \qquad \text{(Eq. 2)}$$

Where $Z(V,B,C) := \log \det(V^T V + B^T C B + I)$ and $V^T$ and $B^T$ are matrix transpositions of matrices V and B respectively. For each time step t, $V_{S_t}$, $B_{S_t}$, C are updated using a gradient of $\psi$. In an example implementation, a gradients used to update $V_{S_t}$, $B_{S_t}$, C are defined as:

$$\nabla_{V_{S_t}} \psi_t = 2 V_{S_t}(V_{S_t}^T V_{S_t} + B_{S_t}^T C B_{S_t})^{-1} - \nabla_{V_{S_t}} Z - 2\alpha V_{S_t} \qquad \text{(Eq. 3)}$$

$$\nabla_{B_{S_t}} \psi_t = 2 C B_{S_t}(V_{S_t}^T V_{S_t} + B_{S_t}^T C B_{S_t})^{-1} - \nabla_{B_{S_t}} Z - 2\beta B_{S_t} \qquad \text{(Eq. 4)}$$

$$\nabla_C \psi_t = B_{S_t}(V_{S_t}^T V_{S_t} + B_{S_t}^T C B_{S_t})^{-1} B_{S_t}^T - \nabla_C Z \qquad \text{(Eq. 5)}$$

In some cases, for every new subset $S_t$ arriving in a stream of compatible sets, the columns of matricies V and B corresponding to the elements in $S_t$ are updated with only a single pass over the stream. In such an example, only $S_t$ is necessary to update the compatibility distribution 220 at time t, and thus only a single pass through the incoming stream is required while using a space that is independent of the length of the incoming stream. Thus, $S_t$ may be discarded once the compatibility distribution 220 has been updated.

Example Compatible Set Recommendation Techniques

Figure 3:
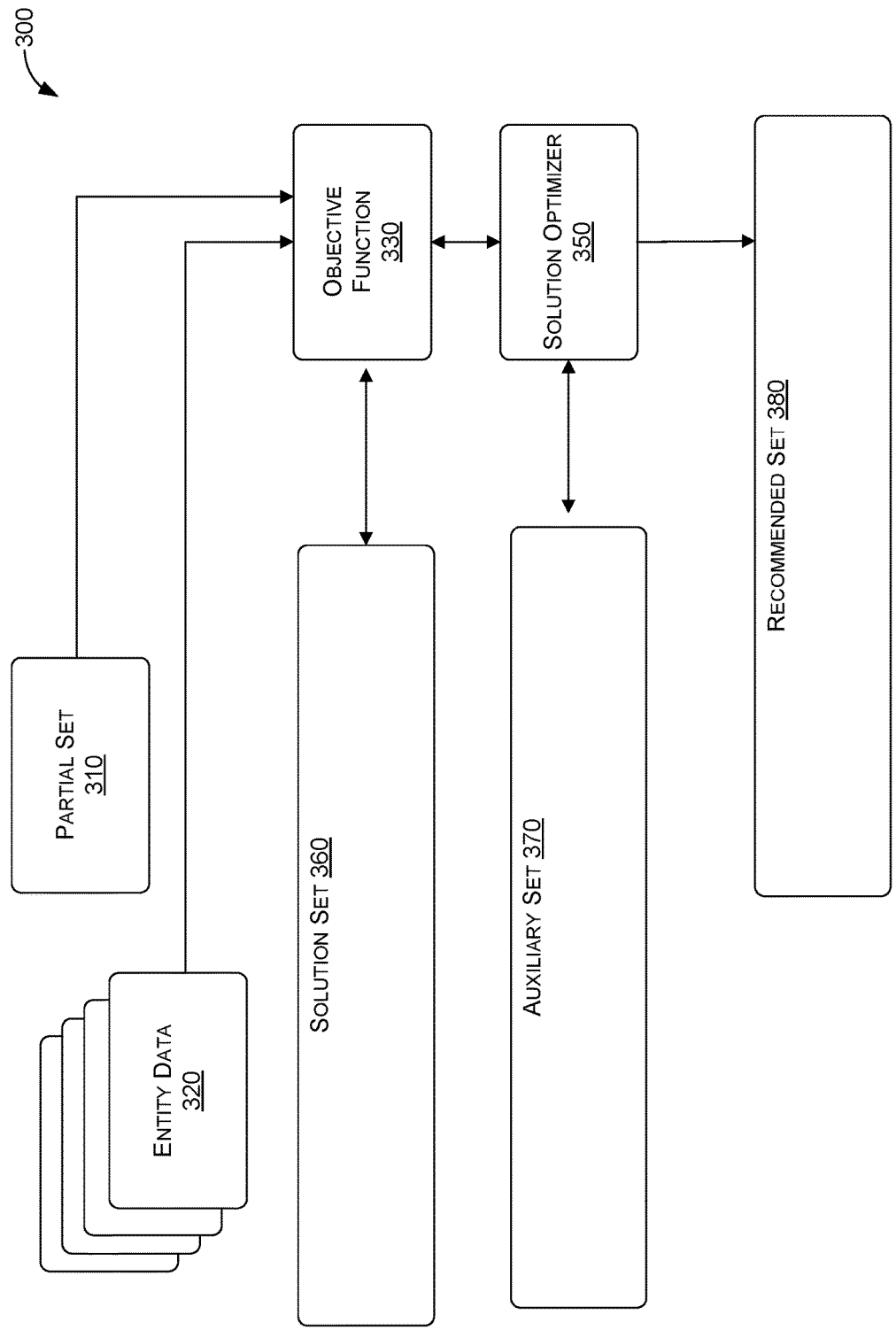
FIG. 3 is a data flow diagram illustrating an example entity compatibility prediction model, in accordance with embodiments of the present invention.

FIG. 3 is a data flow diagram illustrating an example entity compatibility prediction model 300 including objective function 330, solution optimizer 350, solution set 360, auxiliary set 370, and recommended set 380. In some embodiments, compatibility prediction model 300 and its components correspond with feature extraction module 110 of FIG. 1 and its components. In some embodiments, the compatibility prediction model 300 is configured to access, or otherwise sample, an updated kernel, such as the compatibility distribution 220 discussed in relation to FIG. 2, to determine the recommended set 380. For instance, a kernel that is updated over a period of time is accessed such that updated and potentially better recommendations of compatible sets are provided as new item and/or newly extracted item embeddings are reflected in the compatibility distribution 220. As an example, as new webpages are visited by a user, a kernel corresponding to extracted embeddings of visited webpages is updated and subsequently a new recommendation of compatible webpages is generated in response to the updated kernel.

Generally, compatibility prediction model 300 accepts a partial set 310 that includes one or more entities. For example, a partial set 310 includes n entities out of a total set cardinality of k. For instance, the partial set 310 includes a set of 9 items present in a shopping basket of an online marketplace, where the desired set cardinality is 10. In some embodiments, the compatibility prediction model 300 accepts a stream of entity data 320 that represents one or more entities with which the compatibility prediction model 300 analyzes to determine whether to include one or more entities represented in the entity data 320 in the partial set 310 and recommended to the user as the recommended set 380.

Some embodiments maintain and update the solution set 360 as the stream of entity data 320 is received, such that a most compatible set of entities is stored and/or presented as the recommended set 380. For example, the objective function 330 maintains a solution set of entities, such as solution set 360. When the objective function 330 accepts a new entity from the stream of entity data 320, it attempts to replace an index (e.g., an entity) of the solution set 360 with the newly arrived entity. If the replacement of an existing entity with the newly arrived entity in the solution set 360 increases a maximization function, the new entity is preserved in the solution set 360. In an example implementation, a maximization function is defined as:

$$f(S) = \det(V_S^T V + B_S^T C B) \qquad \text{(Eq. 6)}$$

where $V_S$ and $B_S$ are matrices formed the arriving entity data 320 represented as data points $(v_t, b_t)$ and S is the solution set 360. In some embodiments, $V_S^T V + B_S^T C B$ is generated as the compatibility distribution 168 by the feature extraction module 106 as described above with respect to FIGS. 1 and 2.

Some embodiments replace an entity previously included within the solution set 360 with a newly arrived entity from the entity data 320, instead of being discarded, it is stored in the auxiliary set 370. The objective function 330 uses the solution optimizer 350 to perform a local search over the auxiliary set 370 to find a locally optimal solution to include in the solution set 360. For example, whenever the algorithm sees a new data-point $(v_t, b_t)$, it checks if the quality of the solution set 360 can be improved by a predetermined factor by replacing any element in the solution set 360 with the newly seen data-point. Additionally, it also checks if the quality of the solution set 360 is improved by including both the points $(v_t, b_t)$ and the data-point $(v_{t-1}, b_{t-1})$. Further, the algorithm tries to improve the solution quality by performing a local search on $N_2(S,T)$ (i.e., the neighborhood of the solution set 360 using the auxiliary set 370 (T) by replacing at most two elements of the solution set 360), where:

$$N_r(S,T) := \{S' \subseteq S \cup T \mid |S'| = |S| \text{ and } |S' \setminus S| \leq r\} \qquad \text{(Eq. 7)}$$

Some embodiments perform a local search over two-neighborhoods to identify interactions captured by pairs of entities which are much stronger than single items in entity data 320.

Some embodiments provide the recommended set 380 that includes a set of compatible entities. In some examples, the recommended set 380 corresponds to the presently optimal solution represented by the solution set 360. In such an example, the recommended set 380 is the recommended solution at a particular time and/or as entity data 320 continues to arrive. In at least one example, the recommended set 380 is provided once the entirety of the entity data 320 has been received and analyzed to determine the solution set 360.

Example Flow Diagrams

Figure 4:
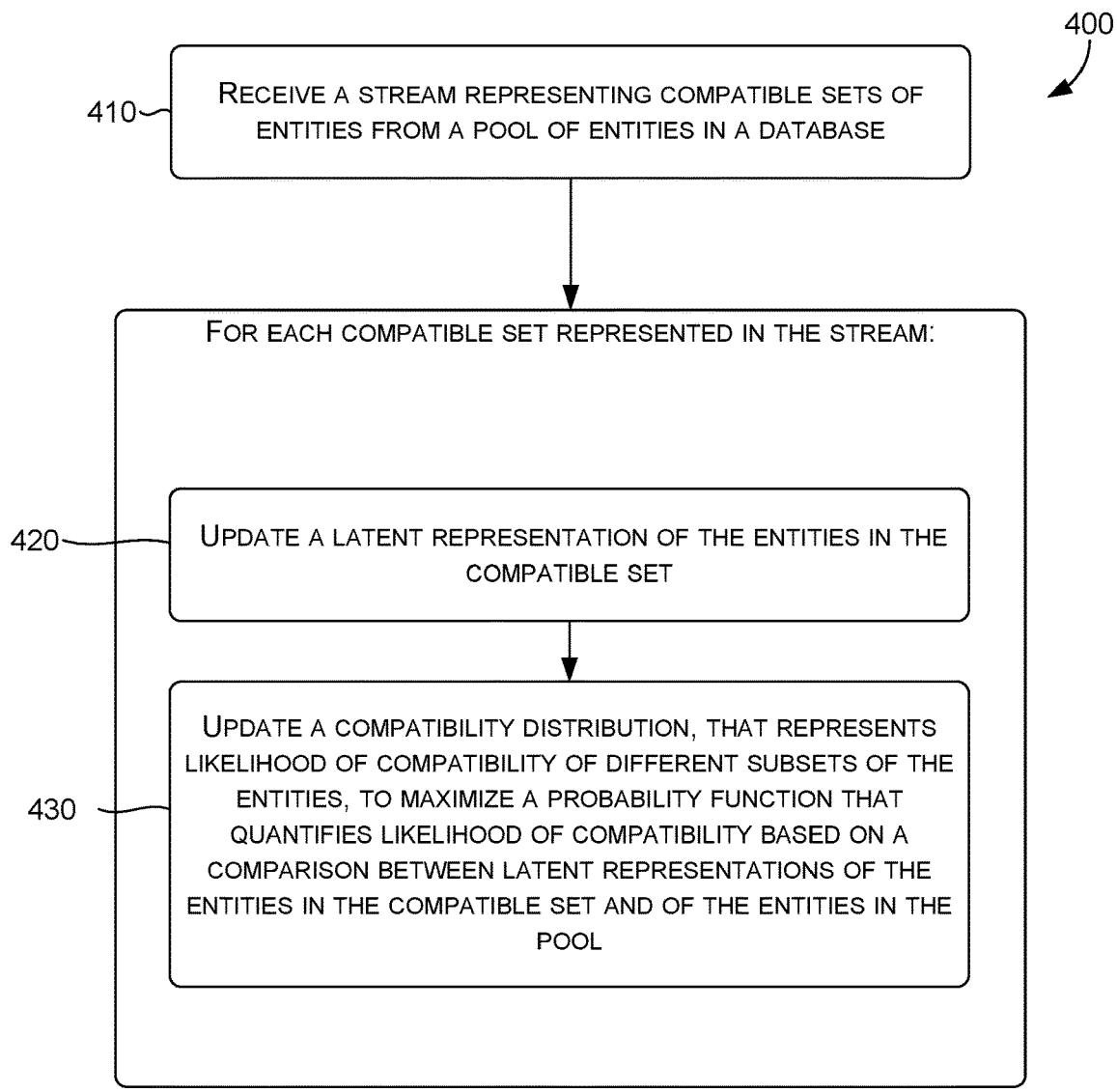
FIG. 4 is a flow diagram showing a method for online learning of compatible sets of entities, in accordance with embodiments of the present invention.
Figure 5:
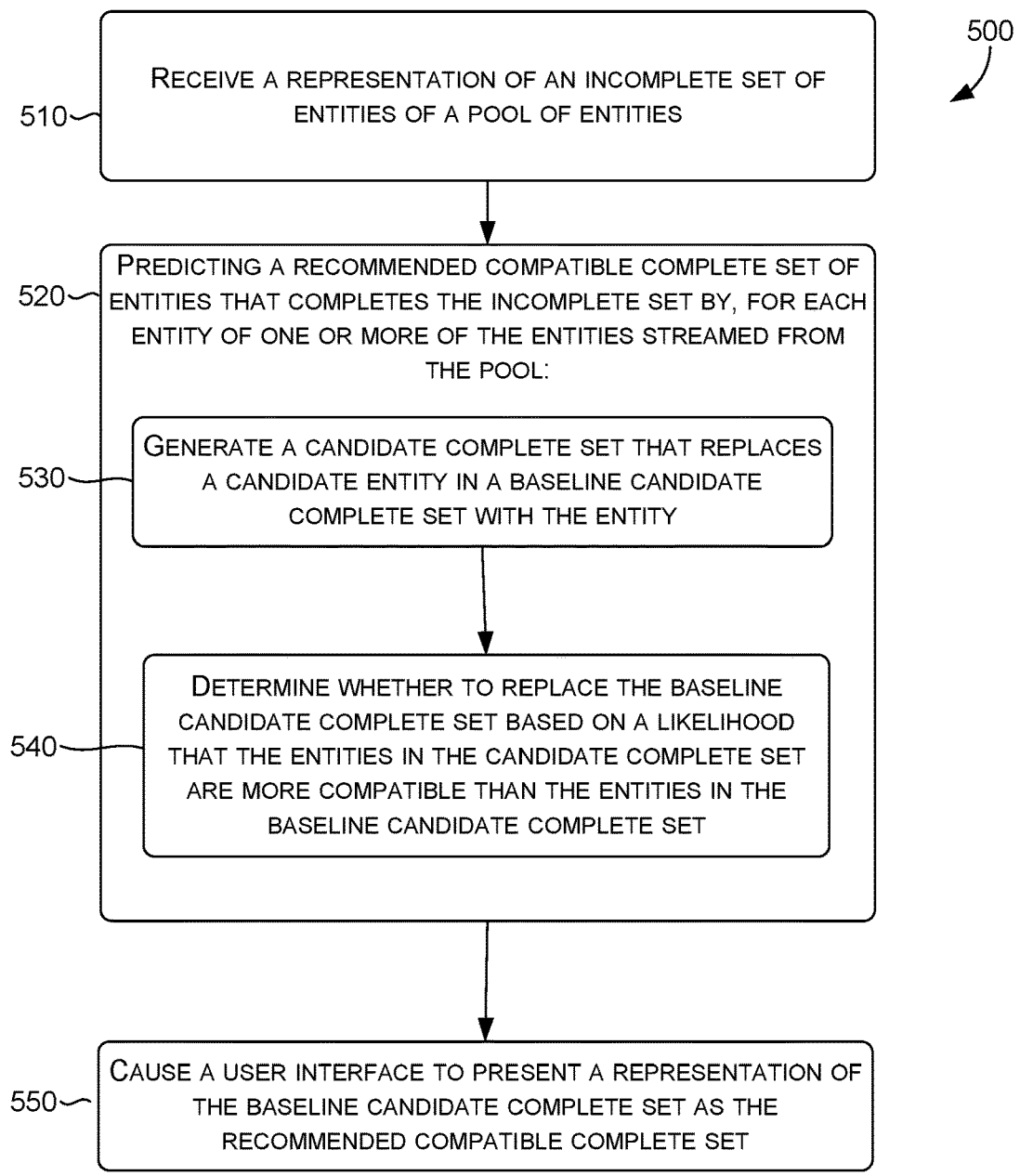
FIG. 5 is a flow diagram showing a method for online inference of compatible sets of entities, in accordance with embodiments of the present invention.

With reference now to FIGS. 4-5, flow diagrams are provided illustrating various methods for online learning and inference of compatible sets of entities. Each block of the methods 400 and 500 and any other methods described herein comprise a computing process performed using any combination of hardware, firmware, and/or software. For instance, in some embodiments, various functions are carried out by a processor executing instructions stored in memory. In some cases, the methods are embodied as computer-usable instructions stored on computer storage media. In some implementations, the methods are provided by a standalone application, a service or hosted service (standalone or in combination with another hosted service), or a plug-in to another product, to name a few.

Turning initially to FIG. 4, FIG. 4 illustrates a method 400 for online learning of compatible sets of entities, in accordance with embodiments described herein. Initially at block 410, a stream representing compatible sets of entities from a pool of entities in a database is received. At block 420, for each compatible set represented in the stream, a latent representation of the entities in the compatible set is updated. At block 430, for each compatible set represented in the stream, a compatibility distribution that represents likelihood of compatibility of different subsets of the entities is updated to maximize a probability function that quantifies likelihood of compatibility based on a comparison between latent representations of the entities in the compatible set and the of the entities in the pool.

Turning now to FIG. 5, FIG. 5 illustrates a method 500 for online inference of compatible sets of entities, in accordance with embodiments described herein. Initially at block 510, a representation of an incomplete set of entities of a pool of entities is received. At block 520, a recommended compatible complete set of entities that completes the incomplete set is predicted by—at block 530—for each entity of one or more of the entities streamed from the pool, a candidate complete set that replaces a candidate entity in a baseline candidate complete set with the entity is generated, and—at block 540—it is determined whether to replace the baseline candidate complete set based on a likelihood that the entities in the candidate complete set are more compatible than the entities in the baseline candidate complete set. At block 550, a user interface is caused to present a representation of the baseline candidate complete set as the recommended compatible complete set.

Example Operating Environment

Figure 6:
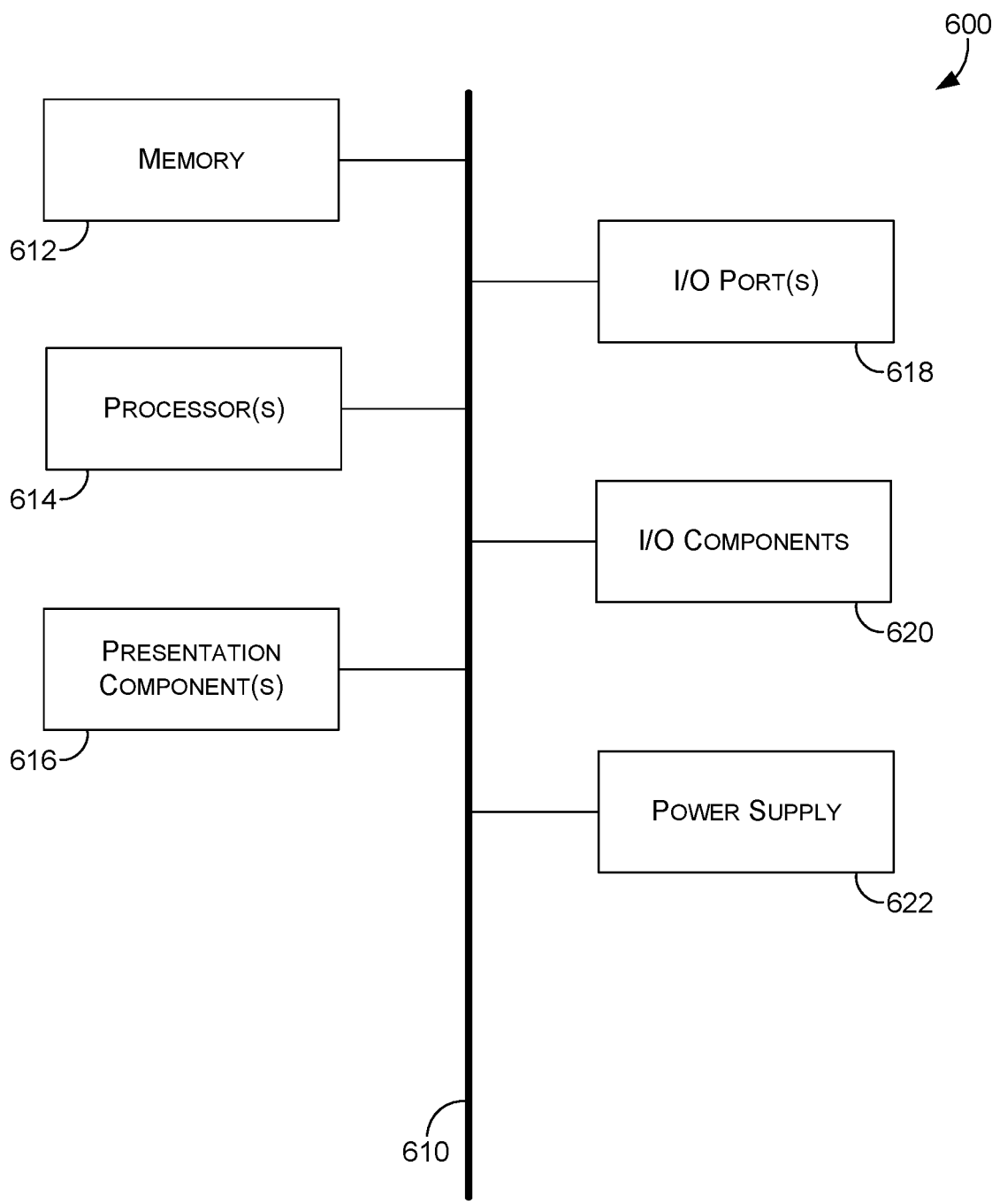
FIG. 6 is a block diagram of an example computing environment suitable for use in implementing embodiments of the present invention.

Having described an overview of embodiments of the present invention, an example operating environment in which some embodiments of the present invention are implemented is described below in order to provide a general context for various aspects of the present invention. Referring now to FIG. 6 in particular, an example operating environment for implementing embodiments of the present invention is shown and designated generally as computing device 600. Computing device 600 is but one example of a suitable computing environment and is not intended to suggest any limitation as to the scope of use or functionality of the invention. Neither should computing device 600 be interpreted as having any dependency or requirement relating to any one or combination of components illustrated.

In some embodiments, the present techniques are embodied in computer code or machine-useable instructions, including computer-executable instructions such as program modules, being executed by a computer or other machine, such as a cellular telephone, personal data assistant or other handheld device. Generally, program modules including routines, programs, objects, components, data structures, etc., refer to code that perform particular tasks or implement particular abstract data types. Various embodiments are practiced in a variety of system configurations, including hand-held devices, consumer electronics, general-purpose computers, more specialty computing devices, etc. Some implementations are practiced in distributed computing environments where tasks are performed by remote-processing devices that are linked through a communications network.

With reference to the example operating environment illustrated in FIG. 6, computing device 600 includes bus 610 that directly or indirectly couples the following devices: memory 612, one or more processors 614, one or more presentation components 616, input/output (I/O) ports 618, input/output components 620, and illustrative power supply 622. Bus 610 represents what may be one or more busses (such as an address bus, data bus, or combination thereof). Although the various blocks of FIG. 6 are shown with lines for the sake of clarity, in some cases, it is not possible to delineate clear boundaries for different components. In this case, metaphorically, the lines would be grey and fuzzy. As such, the diagram of FIG. 6 and other components described herein should be understood as merely illustrative of various example implementations, such as an example computing device implementing an embodiment or a portion thereof. Distinction is not made between such categories as "workstation," "server," "laptop," "hand-held device," etc., as all are contemplated within the scope of FIG. 6 and a "computing device."

Computing device 600 typically includes a variety of computer-readable media. Computer-readable media can be any available media that can be accessed by computing device 600 and includes both volatile and nonvolatile media, and removable and non-removable media. By way of non-limiting example, in some cases, computer-readable media comprises computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer-storage media in the form of volatile and/or nonvolatile memory. In various embodiments, the memory is removable, non-removable, or a combination thereof. Example hardware devices include solid-state memory, hard drives, optical-disc drives, etc. Computing device 600 includes one or more processors that read data from various entities such as memory 612 or I/O components 620. Presentation component(s) 616 present data indications to a user or other device. Example presentation components include a display device, speaker, printing component, vibrating component, etc.

I/O ports 618 allow computing device 600 to be logically coupled to other devices including I/O components 620, some of which may be built in. Illustrative components include a microphone, joystick, game pad, satellite dish, scanner, printer, wireless device, etc. The I/O components 620 may provide a natural user interface (NUI) that processes air gestures, voice, or other physiological inputs generated by a user. In some instances, inputs are transmitted to an appropriate network element for further processing. In some embodiments, an NUI implements any combination of speech recognition, stylus recognition, facial recognition, biometric recognition, gesture recognition both on screen and adjacent to the screen, air gestures, head and eye tracking, and/or touch recognition (as described in more detail below) associated with a display of computing device 600. In some cases, computing device 600 is equipped with depth cameras, such as stereoscopic camera systems, infrared camera systems, RGB camera systems, touchscreen technology, and combinations of these, for gesture detection and recognition. Additionally or alternatively, the computing device 600 is equipped with accelerometers or gyroscopes that enable detection of motion, and in some cases, an output of the accelerometers or gyroscopes is provided to the display of computing device 600 to render immersive augmented reality or virtual reality.

Embodiments described herein support entity inference and learning operations. The components described herein refer to integrated components of an entity inference and learning system. The integrated components refer to the hardware architecture and software framework that support functionality using the entity inference and learning system. The hardware architecture refers to physical components and interrelationships thereof and the software framework refers to software providing functionality that can be implemented with hardware embodied on a device.

In some embodiments, the end-to-end software-based system operates within the components of the entity inference and learning system to operate computer hardware to provide system functionality. At a low level, hardware processors execute instructions selected from a machine language (also referred to as machine code or native) instruction set for a given processor. The processor recognizes the native instructions and performs corresponding low-level functions relating, for example, to logic, control and memory operations. In some cases, low-level software written in machine code provides more complex functionality to higher levels of software. As used herein, computer-executable instructions includes any software, including low-level software written in machine code, higher level software such as application software and any combination thereof. In this regard, system components can manage resources and provide services for the system functionality. Any other variations and combinations thereof are contemplated with embodiments of the present invention.

Having identified various components in the present disclosure, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions, etc.) can be used in addition to or instead of those shown.

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media storing computer-useable instructions that, when used by one or more computing devices, cause the one or more computing devices to perform operations comprising:
  receiving a stream representing compatible sets of entities from a pool of entities in a database;
  extracting latent low-dimensional representations of the entities of the compatible sets, wherein the latent low-dimensional representations of the entities are low compared to a size of the stream of compatible sets;
  generating a compatibility distribution for the compatible sets using the extracted latent low-dimensional representations; and for each compatible set represented in the stream, and in response to a new entity arriving in the stream, (i) updating the latent low-dimensional representation of the entities in the compatible set, and (ii) updating a compatibility distribution, that represents likelihood of compatibility of different subsets of the entities, to maximize a probability function that quantifies likelihood of compatibility based on a comparison between latent low dimensional representations of the entities in the compatible set and of the entities in the pool.

2. The one or more computer storage media of claim 1, wherein the operations limit processing of the compatible sets of entities to a single sequential pass of the compatible sets of entities.

3. The one or more computer storage media of claim 1, wherein the latent low-dimensional representation of the entities in the compatible set and the compatibility distribution occupy a memory size that is independent of a length of the stream of compatible sets.

4. The one or more computer storage media of claim 1, the operations further comprising, for a particular compatible set represented in the stream:
updating the compatibility distribution based on the particular compatible set; and
discarding the particular compatible set from local memory upon updating the compatibility distribution.

5. The one or more computer storage media of claim 1, wherein the compatibility distribution comprises a square matrix having row and column dimensions corresponding to a number of the entities in the pool.

6. The one or more computer storage media of claim 1, wherein the compatible sets of entities represent different sets of items in different shopping baskets associated with an online marketplace.

7. The one or more computer storage media of claim 1, wherein the compatible sets of entities represent different sets of user commands issued during different sessions of an application.

8. The one or more computer storage media of claim 1, wherein the compatible sets of entities represent different sets of web pages visited during different online sessions.

9. The one or more computer storage media of claim 1, wherein the compatible sets of entities represent different sets of user traits associated with different user accounts.

10. The one or more computer storage media of claim 1, wherein the compatible sets of entities represent different sets of data attributes observed in different data visualizations.

11. A computerized method comprising:
receiving an incomplete set of entities of a pool of entities;
predicting a complete set of entities that completes the incomplete set using a compatibility distribution generated from latent low-dimensional representations of compatible sets of entities from the pool of entities, the predicted complete set provided as an initial solution set of entities for the incomplete set of entities;
generating an updated solution set that replaces the initial solution set based on a likelihood that the entities in the updated solution set are more compatible than the entities in the initial solution set;
storing the initial solution set as an auxiliary set of entities; and
causing a user interface to present the updated solution set as a recommended set.

12. The computerized method of claim 11, wherein the initial solution set is updated responsive to a single sequential pass of the entities streamed from the pool.

13. The computerized method of claim 11, wherein the incomplete set of entities represents a set of items in a shopping basket associated with an online marketplace, and the initial solution set comprises a recommendation to add one or more items to the shopping basket.

14. The computerized method of claim 11, wherein the incomplete set of entities represents a set of user commands issued during a session of an application, and the initial solution set comprises a recommendation to add one or more user commands to the set of user commands.

15. The computerized method of claim 11, wherein the incomplete set of entities represents a set of web pages visited during an online session, and the initial solution set comprises a recommendation to add one or more web pages to the set of web pages.

16. The computerized method of claim 11, wherein the incomplete set of entities represents a set of user traits associated with a user account, and the initial solution set comprises a recommendation to add one or more user traits to the set of user traits.

17. The computerized method of claim 11, wherein the incomplete set of entities represents a set of data attributes observed in a data visualization, and the initial solution set comprises a recommendation to add one or more data attributes to the set of data attributes.

18. The computerized method of claim 11, further comprising:
receiving an entity streamed from the pool of entities;
performing local neighborhood searches within both the updated solution set and the auxiliary set; and
including the entity in the updated solution set presented as the recommended set based on the local neighborhood searches.

19. A system comprising:
at least one processor; and
one or more computer storage media storing computer executable instructions thereon that, when executed by the at least one processor, cause the at least one processor to perform operations comprising:
receiving an entity streamed from a pool of entities comprising compatible sets of entities;
generating an updated solution set of entities that replaces an initial solution set of entities based on a likelihood that the entities in the updated solution set are more compatible than the entities in the initial solution set as determined from a compatibility distribution generated from latent low-dimensional representations of the compatible sets of entities;
storing the initial solution set as an auxiliary set of entities; and
causing a user interface to present the updated solution set as a recommended set.

20. The system of claim 19, further comprising:
receiving another entity streamed from the pool of entities;
performing local neighborhood searches within both the updated solution set and the auxiliary set; and
including the another entity in the updated solution set presented as the recommended set based on the local neighborhood searches.

* * * * *